UNITED STATES PATENT OFFICE.

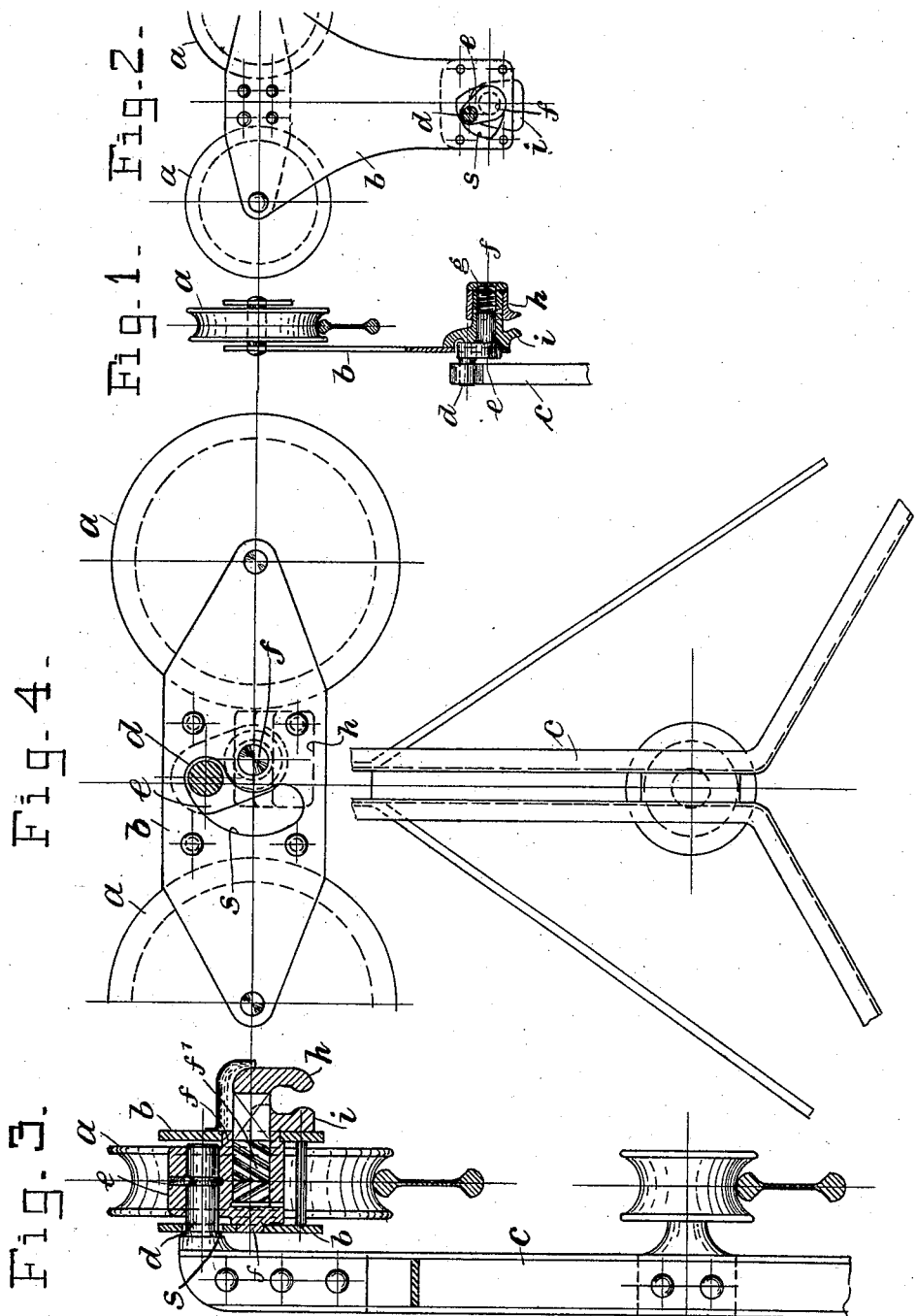

SVEN CARLSON, OF STOCKHOLM, AND RICHARD PETRUS PETTERSSON, OF FALUN, SWEDEN.

FRICTION-GRIP FOR ROPEWAY-TRUCKS.

No. 828,190.

Specification of Letters Patent.

Patented Aug. 7, 1906.

Application filed April 29, 1904. Serial No. 205,493.

*To all whom it may concern:*

Be it known that we, SVEN CARLSON, residing at Stockholm, and RICHARD PETRUS PETTERSSON, residing at Falun, Sweden, subjects of the King of Sweden, have invented an Improvement in Friction-Grips for Ropeway-Trucks, of which the following is a specification.

Our invention relates to friction-grips for ropeway-trucks; and the object thereof is the utilization of the weight of the load through novel means to effect a gripping force to engage a traveling cable and thereby connect the truck for transporting the load.

In carrying out our invention we employ, together with a suitable frame and the rollers or trolleys mounted therein and which run upon a stationary track or cable, a gripper, a device to which the load is secured, and devices intermediate of the gripper and the aforesaid device and associated therewith and by which the weight of the load is utilized to actuate the gripper and effect a gripping force against a traveling cable for the movement of the load, all of which will be hereinafter more particularly described.

In the drawings, Figure 1 is an end elevation and partial section illustrating a structure embodying our improved friction-grip. Fig. 2 is a side elevation of the same. Fig. 3 is an end elevation and partial section of a modified form of gripper, and Fig. 4 is a side elevation of the same.

Referring to Figs. 1 and 2, $a$ represents the rollers or trolleys, which are revolubly mounted in a suitable frame comprising the side plates $b$ and any suitable spacing members therefor. $c$ is a hanger or suspension-bar to which the bracket or other device for engaging or receiving the load to be conveyed is directly connected. At one end the hanger $c$ is pivotally connected to a pin or journal $d$, which is integral with or secured in a crank-arm $e$. The shaft $f$ of the crank-arm $e$ is screw-threaded at its outer end and adapted to engage a nut or cap $g$, to which is secured the movable member $h$ of a gripper adapted to engage a traveling cable. The movable member $h$ of the gripper is slidably mounted on the casing forming the journal of the crank-shaft $f$, and this casing is connected to one of the side plates $b$, which, as shown, may be extended, and integral with this casing is the stationary member $i$ of the gripper. The extended plate $b$ is provided with a suitable opening $s$ in which the crank-arm $e$ operates. In this form of the invention it will now be apparent that the weight of the load attached to the hanger $c$ is utilized through the hanger $c$, pin $d$, crank-arm $e$ to turn the crank-shaft $f$, and thereby to move the nut $g$ and movable member $h$ of the gripper by means of the screw-threaded end of the crank-shaft to bind the traveling cable, and, moreover, that the hanger and load may be raised independently of the trolley-frame to open the gripper and release the traveling cable.

In Figs. 3 and 4, wherein the preferred form of our invention is illustrated, the crank-arm $e$ is placed between the side plates $b$ of the frame in which the rollers $a$ are mounted, and the crank-shafts $f$ are journaled in the plates $b$. One of the plates $b$ is provided with a suitable opening $s$, through which the pin $d$ extends, this pin $d$ being secured to one end of the hanger $c$ and also being pivotally secured in the outer end of the crank-arm $e$. Concentrically with its bearing-points and on one side the crank-arm is provided with a screw-threaded opening in which is received the screw-threaded end of the spindle $f'$ of the movable member $h$ of the gripper, the stationary member $i$ of the gripper being secured to one of the side plates $b$ in any desired manner. In this form the crank-arm is moved by the weight of the load through the hanger $c$ and in turn moves the spindle $f'$ to actuate the gripper to bind the cable, and, as shown, a suitable roller may be mounted upon a bearing secured to the hanger $c$ beneath the trolley-frame and caused to run up onto a suitable rail to raise the hanger and load, move the gripper in the opposite direction, and release the traveling cable.

It will now be apparent that in the structures of our improved gripper herein disclosed the weight of the load is at all times during the transmission thereof the main factor creating and determining the gripping pressure upon the traveling cable, and, moreover, that with a given load the gripping force exerted is practically constant at all times during the travel of the load.

We claim as our invention—

1. In a friction-grip, the combination with a traveling frame and rollers mounted therein, of a screw-spindle, a movable jaw to which a right-line reciprocating movement is imparted by the said screw-spindle, a fixed jaw and means for actuating the said screw-spindle and to which the load is directly connected for support.

2. In a friction-grip, the combination with a traveling frame and rollers mounted therein, of a screw-spindle, a movable jaw to which a right-line reciprocating movement is imparted by the said screw-spindle, a fixed jaw, a crank coacting with the said screw-spindle and an arm pivotally hung from the said crank and to which the load is directly connected for support.

3. In a friction-grip, the combination with a frame and rollers mounted therein, of a crank-arm, a screw-spindle actuated thereby, a gripping-jaw integral with the said screw-spindle, a fixed jaw, a hanger to which the load is attached and a direct connection between the said crank-arm and hanger.

4. A friction-grip, comprising a frame, rollers mounted therein, a crank-arm pivotally mounted between the members of said frame, a screw-threaded spindle operating in a screw-threaded opening concentric with the pivotal bearings of the crank-arm, a jaw fixed on the said spindle, a jaw fixed on the said frame, a hanger pivotally connected to the said crank-arm and to which the load is directly connected, and means for raising said hanger and load.

5. A friction-grip, comprising a frame, rollers mounted therein, a crank-arm pivotally mounted between the members of said frame, a screw-threaded spindle operating in a screw-threaded opening concentric with the pivotal bearings of the crank-arm, a jaw fixed on said spindle, a jaw fixed on the said frame, a hanger pivotally connected to the said crank-arm and to which the load is directly connected, a roller and a bearing therefor connected to said hanger and by which the said hanger and load may be raised.

In witness whereof we have hereunto set our hands in the presence of two witnesses.

SVEN CARLSON.
RICHARD PETRUS PETTERSSON.

Witnesses:
CARL FRANC,
FLEMING GILLERSTODT.